United States Patent
Burgeson

[19]

[11] Patent Number: 6,158,668
[45] Date of Patent: Dec. 12, 2000

[54] HANGING SCENT WICK CONTAINER

[76] Inventor: John R. Burgeson, 4345 157th Ave. NW., Anoka, Minn. 55304

[21] Appl. No.: 09/433,991

[22] Filed: Nov. 4, 1999

[51] Int. Cl.⁷ ..................................................... A24F 25/00
[52] U.S. Cl. .................................... 239/47; 239/44; 43/1; 222/187
[58] Field of Search .................................. 239/34, 37, 43, 239/44, 47, 49, 50, 53, 55, 56; 43/1, 2; 222/187; 119/771; D22/119

[56] References Cited

U.S. PATENT DOCUMENTS

| | | | |
|---|---|---|---|
| 2,452,424 | 10/1948 | Bell | 239/47 |
| 2,537,357 | 1/1951 | Levin | 239/47 |
| 2,616,759 | 11/1952 | Walsh | 239/47 |
| 2,959,354 | 11/1960 | Beck | 239/34 X |
| 3,046,192 | 7/1962 | Bilyeu | 43/1 |
| 4,523,717 | 6/1985 | Schwab | 439/56 X |
| 5,000,383 | 3/1991 | Van Der Heijden | 239/47 |
| 5,060,411 | 10/1991 | Uhlman | 43/1 |
| 5,263,274 | 11/1993 | Speed | 239/43 X |
| 5,361,527 | 11/1994 | Burgeson . | |
| 5,429,271 | 7/1995 | Porter | 239/34 X |
| 5,622,314 | 4/1997 | Eason | 239/47 |
| 5,746,019 | 5/1998 | Fisher | 239/47 X |
| 5,832,648 | 11/1998 | Malone | 239/47 X |
| 5,857,281 | 1/1999 | Bergquist et al. | 43/1 |

OTHER PUBLICATIONS

Tradition, 1999 catalog, Wildlife Research Center, "The Brand Hunters Count On", 8 pages.

*Primary Examiner*—Patrick Brinson
*Assistant Examiner*—Steven J. Ganey
*Attorney, Agent, or Firm*—Gerald E. Helget; Rider, Bennett, Egan & Arundel

[57] ABSTRACT

A reusable hanging container and scent wick for attracting big game has a closed end with a hanger for supporting the container above the ground. An opening into the container is located on the bottom of the container with a cap to sealably close the container. A scent wick for receiving and disbursing a big game scent is sized to fit within the container to permit the sealing of the container with a cap. The scent wick is shaped to permit a substantial portion of the wick to fall out of the container to expose the scent wick while the container above protects the wick from falling moisture.

16 Claims, 2 Drawing Sheets

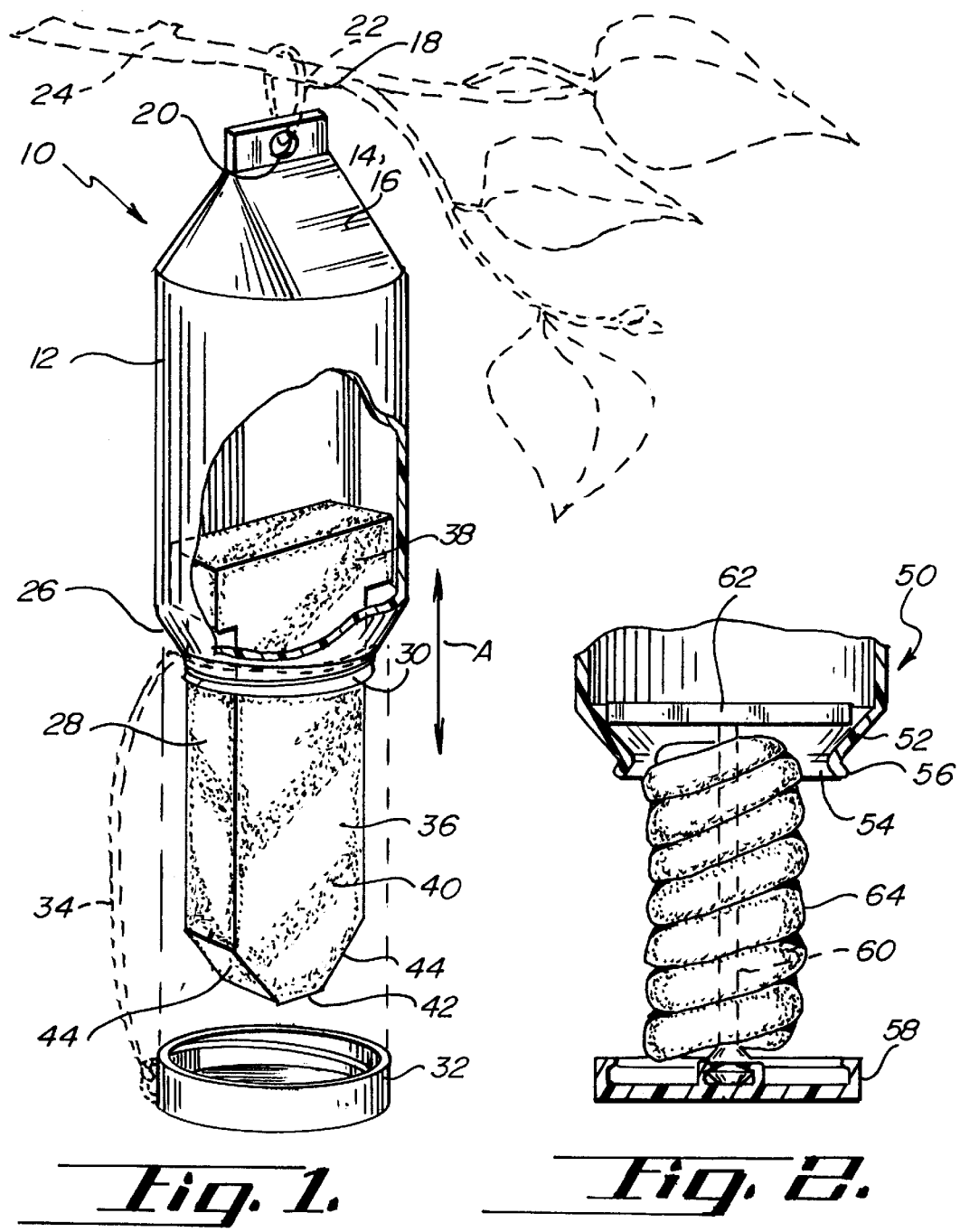

though the container is suitably plastic, some other lightweight and easily available materials may be used as well, such as glass or aluminum or other metals. -->

HANGING SCENT WICK CONTAINER

BACKGROUND OF THE INVENTION

The present invention relates generally to devices used in hunting for the release of attractant scents, and more particularly, to a reusable hanging scent container and scent wick therefor.

The use of animal attractant scents by hunters to increase their chances of hunting success is well known. In particular, these scents can be used in ways to take advantage of the mating processes of certain species. For example, in the case of white tail deer, it is known that the buck will prepare a "scrape" to attract a doe. The scrape is prepared by the buck as he scrapes the around with his hooves at a particular spot and deposits some urine thereon. This action call serve to attract a doe who will then periodically deposit a particular scent, produced when in heat, on the scrape, thereby indicating her receptiveness for mating. The buck will, in this manner, be alerted to the presence of the doe and will tend to spend more time in the location of his scrape. This increase in time spent in a particular area makes him easier to hunt.

Thus, hunters will prepare an artificial scrape, or locate a natural scrape, in an attempt to attract a buck. This is done by scraping the ground in a manner similar to that of the buck, and then depositing a commercially available scent thereon as shown in co-owned U.S. Pat. No. 5,361,527 that signals to the buck the presence of a doe in the correct stare of her estrus cycle.

Some hunters do not wish to make artificial scrapes or tamper with real scrapes. Rather, the hunters will simply establish a protected position or stand to hunt from, around which he will distribute the scent. Various scent dispensing devices are known, such as those shown in U.S. Pat. Nos. 5,035,435; 4,523,717; 3,046,192; and 2,959,354. Such prior art scent dispensers include absorbent material to hold and permit the slow release of the scent therefrom into the ambient air. However, many such prior art dispensers are complicated or simply do not protect the scent wick from harsh weather conditions, including wind, rain and snow, which will significantly affect the effectiveness of the scent dispersion. Furthermore, such scent wick dispensers are nothing more than simple absorbent materials that do not readily permit their reuse.

Accordingly, it would be very desirable to have a reusable hanging scent wick container with a protrudable wick for dispersion of the scent. The container should provide cover and protection for the wick and permit the simple retraction of the wick into the container or housing for storage and later use of the scent wick.

SUMMARY OF THE INVENTION

A reusable hanging container and scent wick for attracting big game has a closed end with hanging means for supporting the container above the ground. An opening into the container is located on the bottom of the container with a cap to sealably close the container. A scent wick for receiving and disbursing a big game scent is sized to fit within the container to permit the sealing of the container with a cap. The scent wick is shaped to permit a substantial portion of the wick to fall out of the container to expose the scent wick while the container above protects the wick from falling moisture.

A principal object and advantage of the present invention is that the reusable hanging container permits repeated reuse of scent wicks which are otherwise left remaining in the wilderness due to their foul odor.

Another object and advantage of the present invention is that the reusable hanging container and scent wick combination readily permits the scent wick to be reused by scalable storage of the scent wick within the container.

Another object and advantage of the present invention is that the container and scent wick combination permits quick placement within the wilderness and as well as quick and easy closure and transportation out of the wilderness as to not alert the male species that they are being tricked into believing that a receptive female is present.

Another object and advantage of the present invention is that the hanging container protects the scent wick from above to eliminate moisture from falling onto the scent wick, which would otherwise dilute the animal scent on the wick.

Another object and advantage of the present container scent wick configuration is that the container readily permits the extension of the scent wick out of the container to provide maximum exposure of the wick into the ambient air in sufficient quantities to attract an animal.

Another object and advantage off the present invention is that the combination container and scent wick is small and lightweight and therefore, easy for the hunter to carry into and out of the woods while yet containing a scent within the container and not contaminating the hunter.

BRIEF DESCRIPTION OF THE DRAWINGS

FIG. 1 is an exploded partially broken away view of the reusable hanging container, scent wick of the present invention hanging from a tree limb in phantom outline;

FIG. 2 is a partially broken away front elevational view of a second embodiment of the present invention;

DETAILED DESCRIPTION OF THE PREFERRED EMBODIMENT

Figure 3:
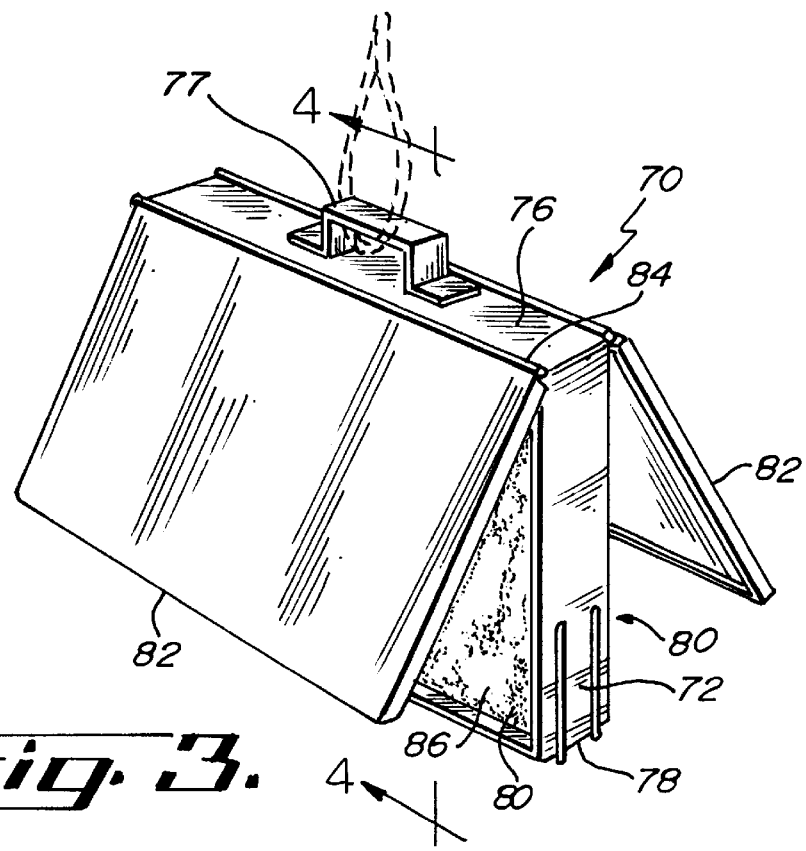
FIG. 3 is a perspective third embodiment of the present invention.

Referring, to FIG. 1, the reusable hanging scent wick container 10 is suitably made of plastic. The container has walls 12 with a closed end 14 which suitably may be roof topped 16. At the closed end 14 are located appropriate hanging means 18 which may be an aperture 20 through a roof topped close end 14 through which a fastener 22 is passed to secure the container 10 to a branch 24 from above. Fastener 22 may be a wire, string, hook or any other like device.

The container 10 opposite the closed end 14 has a tapered neck portion 26 adjacent and above the container opening 28 which has external threads 30. A threaded cap 32 may then be used to sealably close the container. The cap retainer 34 may also be provided which may be of any of a variety of known securing devices such as a plastic ring captured around the threads and attached to the cap 32.

Scent wick 36 is preferably T-shaped and suitably made out of polyester fabric, foam or cotton which is readily absorbent. The top portion 38 of wick 36 forms the upper cap of the T with a downwardly depending wick portion 40 ending with an angled or pointed tip 42 having beveled portions 44.

As can be appreciated, with the scent wick 36 wholly enclosed within the container 10 and sealed therein by threaded cap 32, the removal of the cap 32 and directing the orientation of hanging scent wick container 10 along double arrow A will permit the beveled portions 44 of scent wick to work in combination with the tapered neck portion 26 to ensure that the scent wick 36 falls out of the container 10 exposing the depending wick portion 40. Cap 32 may simply be suspended from the container 10 by retainer means 34.

Referring to FIG. 2, a second embodiment of the reusable hanging scent wick container 50 is disclosed. The container 50 also has a tapered neck portion 52 adjacent and above opening 54 whereat is located cap ceiling lip 56. Cap 58 secures about the opening with a snap-like securement about lip 56. Extending upwardly from cap 58 is a spindle 60 which at its remote end has a retainer ring 62. Wrapped around spindle 60 is a rope-like wick 64 similarly made of polyester fabric, foam or cotton.

Upon orienting the second embodiment scent wick container 50 so that the opening 54 is directed downwardly, and pulling cap 58 off of lip 56, the cap 58 and spindle 60 with wick 64 slide out and become exposed to the ambient air. Retainer ring 62 supports tile cap, spindle and wick in this condition until the container is turned right side up, after which the assembly closes and the cap 58 is sealed at lip 56.

Figure 4:
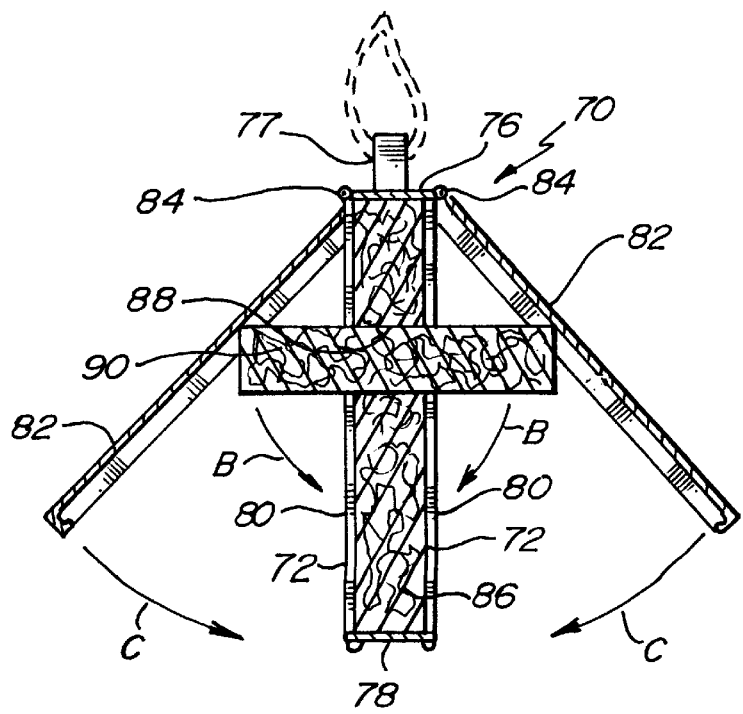
FIG. 4 is a cross-sectional view taken along lines 4—4 of FIG. 3.

Referring to FIGS. 3 and 4, a third hanging scent wick container embodiment 70 is shown. The container 70 has side walls 72 and top wall 76. A hanger 77 is mounted on top wall 76. The container also has bottom wall 78 and open sides 80. Pivoting caps. doors or covers 82 are mounted to top wall 76 by hinges 84. A wick or bladder 86 is supported within the container 76 by side walls 72, top wall 76 and bottom wall 78.

Through wick 86 is a central opening 88 through which is passed a flexible or crushable extending bladder or wick portion 90. Wick portion 90 folds downwardly in the direction of arrows B to permit the doors to close along arrows C. Upon the release of doors 82, the biased extending bladder or wick portion 90 swings upwardly and horizontally opposite arrows B to support the doors 82 in an open position. Doors 82 protect the wick 90 from falling moisture. Wick 90 may also be positioned within doors or caps 82 so that wick 90 may fit within the container 70 when doors 82 are sealably closed.

It will be appreciated by those of skill in the art that a wide variety of modifications to the present invention with respect to, for example, wick and container shapes and dimensions, and with respect to orientation thereof to each other and to the ground, can be made without departing from the spirit or scope of the essential attributes thereof. Therefore, it is desired that the disclosed embodiments be considered in all respects as illustrative and not restrictive, reference being made to the appended claims rather than to the foregoing description to indicate the scope of the invention.

In the claims:

1. A reusable hanging container and scent wick therefore for attracting big game, comprising:
    a) the container having a closed end with hanging means for supporting the container above the ground;
    b) an opening into the container with a cap to sealably close the container; and
    c) a scent wick for receiving a big game scent, the wick being of a size to fit within the container and to permit sealing of the container with the cap; an
    d) wherein the opening is on a bottom of the container and the scent wick is shaped to permit a substantial portion of the wick to fall out of the container to expose the scent wick while the container above protects the wick from falling moisture.

2. The container and scent wick of claim 1 wherein the container has a neck portion adjacent the opening and the wick has an enlarged top portion greater in size than the neck portion to permit said substantial portion of the wick to fall through the opening out of the container to expose the scent wick.

3. The container and scent wick of claim 2 wherein the neck portion and a bottom tip end of the wick are shaped to guide the wick out of the container.

4. The container and scent wick of claim 3 wherein the cap is securable to the container to prevent cap loss.

5. The container and scent wick of claim 2 wherein the closed end of the container is roof shaped to shed moisture.

6. The container and scent wick of claim 1 wherein the opening is on a side of the container and the cap is pivotally mounted to the closed end and is biased outwardly to expose the scent wick and to cover the scent wick from above to protect the wick from falling moisture.

7. A reusable haning container and scent wick therefor for attracting big game, comprising:
    a) the container having a closed end with hanging means for supporting the container above the ground;
    b) an opening into the container located on the bottom of the container, with a cap to sealably close the container; and
    c) a scent wick for receiving a big game scent, the wick being of a size to fit within the container and to petit sealing of the container with the cap, the scent wick is shaped to permit a substantial portion of the wick to fall out of the container to expose the scent wick while the container above protects the wick from falling moisture.

8. The container and scent wick of claim 7 herein the container has a neck portion adjacent the opening and the wick has an enlarged top portion greater in size than the neck portion to permit said substantial portion of the wick to fall through the opening out of the container to expose the scent wick.

9. The container and scent wick of claim 8 wherein the neck portion and a bottom tip end of the wick are shaped to guide the wick out of the container.

10. The container and scent wick of claim 9 wherein the cap is securable to the container to prevent cap loss.

11. The container and scent wick of claim 7 wherein the closed end of the container is roof shaped to shed moisture.

12. A reusable hanging container and scent wick therefor for attracting big game, comprising:
    a) the container having a closed end with hanging means for supporting the container above the ground;
    b) an opening into the container located on the bottom of the container with a cap to sealably close the container and a neck portion adjacent the opening;
    c) a scent wick for receiving a big game scent, the wick being of a size to fit within the container and to permit scaling of the container with the cap, the scent wick is shaped to permit a substantial portion of the wick to fall out of the container to expose the scent wick while the container above protects the wick from falling moisture, the wick having an enlarged top portion greater in size than the neck portion to permit said substantial portion of the wick to fall through the opening out of the container to expose the scent wick.

13. The container and scent wick of claim 12 wherein the neck portion and a bottom tip end of the wick are shaped to guide the wick out of the container.

14. The container and scent wick of claim 13 wherein the cap is securable to the container to prevent cap loss.

15. The container and scent wick of claim 12 wherein the closed end of the container is roof shaped to shed moisture.

16. A reusable hanging container and scent wick therefore for attracting big game, comprising:

a) the container having a closed end with hanging means for supporting the container above the ground; and b) an opening into the container wherein the opening is on a side of the container and a cap to sealably close the container, the cap being pivotally mounted to the closed end and is biased outwardly to expose the scent wick and to cover the scent wick from above to protect the wick from falling moisture.

* * * * *

UNITED STATES PATENT AND TRADEMARK OFFICE
CERTIFICATE OF CORRECTION

PATENT NO. : 6,158,668
DATED : December 12, 2000
INVENTOR(S) : John R. Burgeson

It is certified that error appears in the above-identified patent and that said Letters Patent is hereby corrected as shown below:

Column 1,
Line 16, please delete the word "call" and insert in its place -- can --.
Line 29, please delete the word "stare" and insert in its place -- stage --.

Column 4,
Line 10, please delete the numeral "3" and insert in its place -- 2 --.
Line 12, please delete the numeral "2" and insert in its place -- 1 --.
Line 27, please delete the word "petit" and insert in its place -- permit --.
Line 42, please delete the numeral "9" and insert in its place -- 8 --.
Line 66, please delete the numeral "13" and insert in its place -- 12 --.

Signed and Sealed this

Sixth Day of November, 2001

Attest:

NICHOLAS P. GODICI
Attesting Officer    Acting Director of the United States Patent and Trademark Office